July 11, 1967 H. F. UMSTOTT 3,330,456
UNIVERSAL GUIDE
Filed Sept. 7, 1965 2 Sheets-Sheet 2

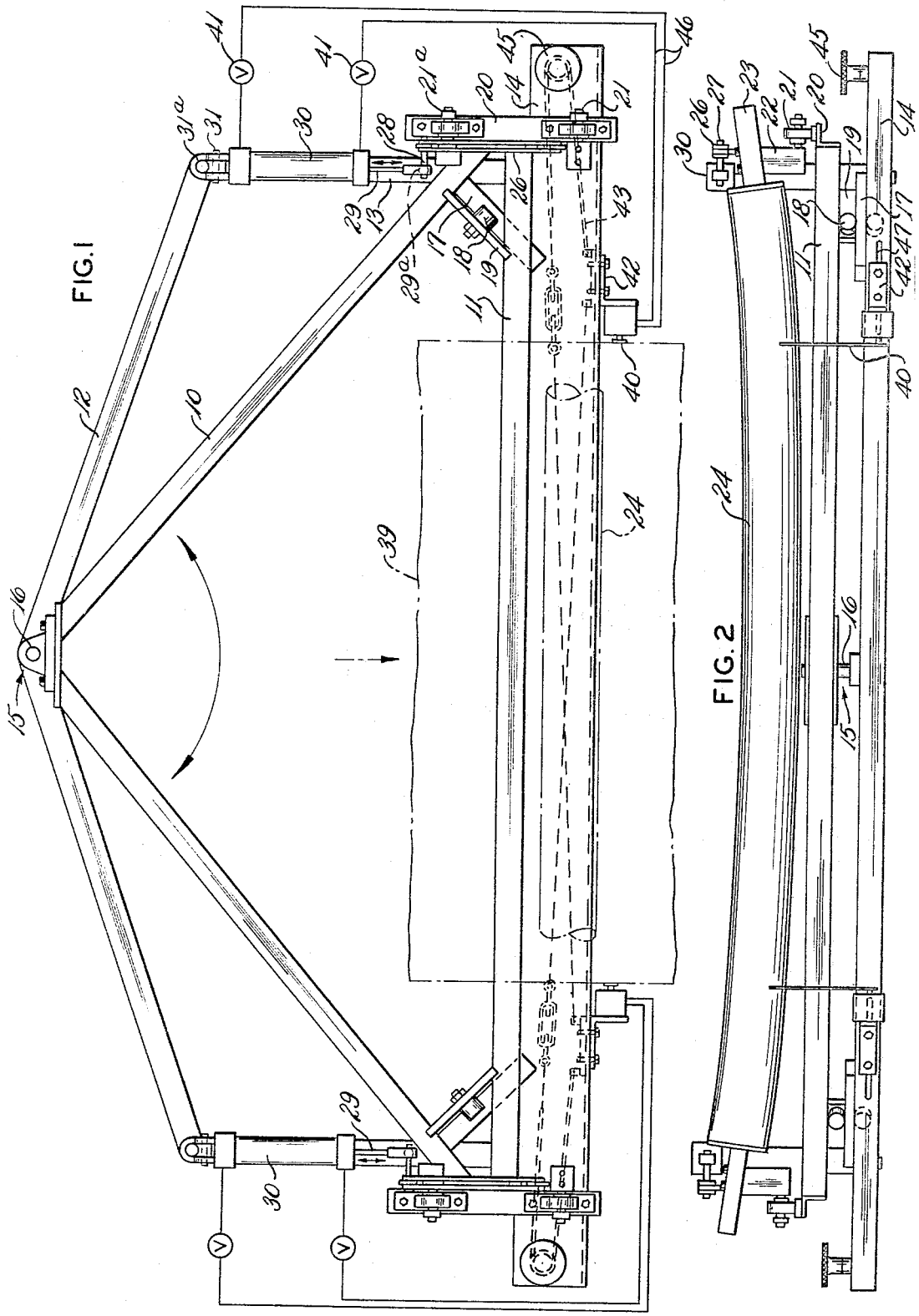

United States Patent Office 3,330,456
Patented July 11, 1967

3,330,456
UNIVERSAL GUIDE
Harold F. Umstott, Akron, Ohio, assignor to The Firestone Tire & Rubber Company, Akron, Ohio, a corporation of Ohio
Filed Sept. 7, 1965, Ser. No. 485,208
12 Claims. (Cl. 226—23)

This invention relates to the control of a continuous, moving sheet, such as webbed fabric, in the processing or manufacturing of such, and to an apparatus designed to provide such control.

The guiding or centering, of such fabric has long been a major problem, and it is necessary that the sheet be controlled continuously within the various processing and tratment machines to provide uniformity of the treatment. Thus, it is a necessity to maintain the sheet in the center of the equipment and not allow transverse displacement of the sheet.

It is an objective of this invention to provide an apparatus to control the guiding or centering of a continuous sheet.

The width variation of a continuous sheet is also of major concern. Due to the treatments these sheets are subjected to, they usually thereby shrink transversely, causing a loss in total inches of fabric product.

It is therefore another objective of this invention to provide an apparatus for expanding said transversely shrunken sheets and also to provide for variable transverse convergence and divergence of the sheet when needed.

Lack of uniformity in the sheet after width control has long been a major drawback in present width controlling equipment. The density or end count per inch may vary widely due to non-uniform expansion across the entire width of the sheet or fabric. It is another object of this invention to provide an apparatus for producing uniform density or end count in the width variation process of the sheet.

These functions of guiding and width control usually have been accomplished through a series of tandem machines. It is another object of this invention to provide for these functions in a single apparatus, thereby decreasing the capital invested in and space requirements for this type of machine.

Still another objective of this invention is to provide an apparatus which has the feature of "movement anticipation." For prior art machines to perform the centering function, the sheet must be moving through the machine before the adjustment is made, whereby the machine may overcompensate and create a cyclic or "tailing" condition in the moving sheet causing the sheet to weave from side to side for a time before it reaches an equilibrium. The machine of the present invention eliminates this "tailing," because the sheet need not be moving in order to compensate for an off-center condition. By adjusting the sensing means prior to operation the proper position may be obtained.

Figure 3:
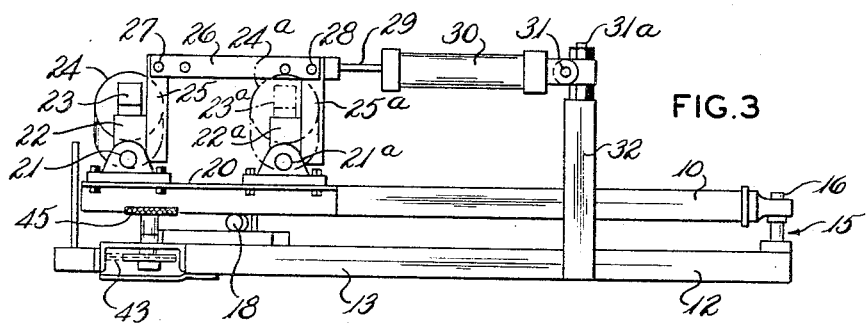
Figure 4:
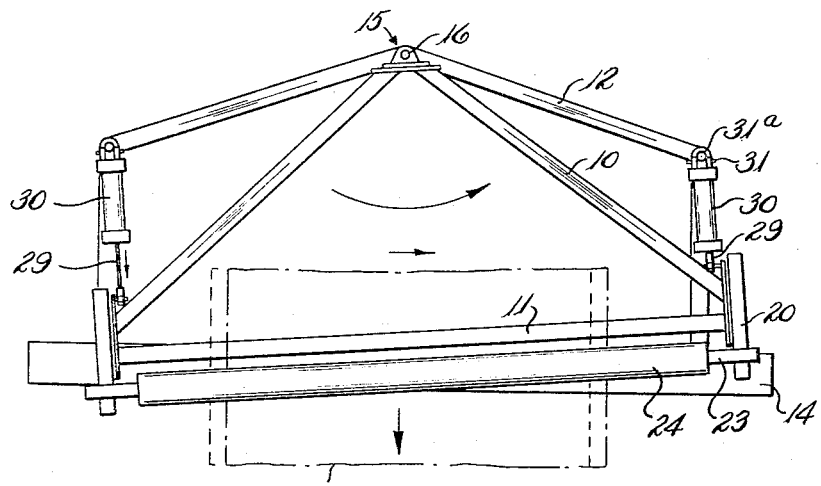
Figure 5:
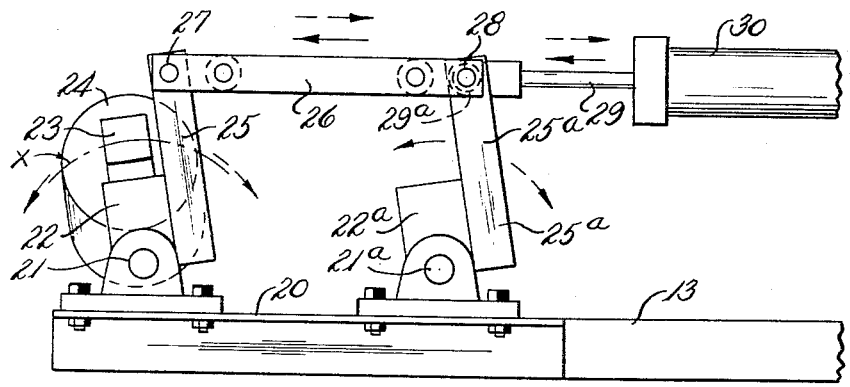

In reference to the drawings:
FIG. 1 is a plan view of the apparatus of the invention.
FIG. 2 is a front elevation of the apparatus of FIG. 1.
FIG. 3 is a side elevation of the apparatus as viewed from the right-hand side of FIG. 2.
FIG. 4 is a somewhat diagrammatic plan view showing the sheet centering means in operation.
FIG. 5 is a fragmentary right side elevation showing the sheet expanding-contracting means in operation.

Referring to FIGURE 2, the roll or rolls employed in this invention have a rigid, one piece, arcuate axle 23, with a flexural tubular sleeve 24, which contacts the continuous sheet, turning on said axle. Said sleeve may be fabricated of any flexible fabric material and preferably of and flexible rubbery or plastic material.

For simplicity in describing this apparatus, reference will only be made to the right hand side, the left hand side being the mirror image of the right. Referring to FIG. 1, the main assemblies of this apparatus are a transversely moveable frame comprised of arms 10 and 11, and a stationary supporting frame comprised of arms 12 and 13, and beam 14. The moveable frame is pivotally mounted on the supporting frame at support 15 (see FIG. 3) through pin 16, and at roller 18. Referring again to FIG. 1, said roller is mounted on the moveable frame by support 19 and moves transversely on track 17 on the stationary frame. One end of arm 10 and one end of arm 11 are attached to bracket 20.

Referring to FIG. 3, mounted on bracket 20 are bearings 21 and 21a. Pivotally mounted on said bearings are supports 22 and 22a, respectively, carrying respectively the axles 23 and 23a of sleeves 24 and 24a. Axles 23 and 23a are bowed with sleeves 24 and 24a rotating flexurally thereon. Attached to said supports are lever arms 25 and 25a, respectively, pivotally attached to arm 26 with pins 27 and 28, respectively. Arm 26 is, in turn, connected at pivot pin 28 through universal ball joint 29a (see FIG. 1) to rod 29 of a hydraulic cylinder 30. Mounted to the stationary frame at the junction of arms 12 and 13 is support 32. Cylinder 30 is pivotally mounted on the opposite end of support 32 and is so adapted to allow said cylinder to pivot about pin 31a (see FIG. 1) allowing motion in a first plane parallel to the plane of transverse motion of the rolls; also the cylinder is mounted to allow motion in a plane perpendicular to said first plane by pivoting about pin 31 (see FIG. 3).

Again referring to FIG. 1, a sensing finger, or feeler 40, is mounted on beam 14 as by support 42, and is adapted to contact an edge of sheet 39. Support 42, may be moved laterally in slot 47 (see FIG. 2) by turning wheel 45 which acts on support 42 through chain 43. Chain 43 also acts on the corresponding sensing finger for the opposite edge of sheet 39. By means of this chain, the sensing fingers for each side of the sheet may be moved in unison equidistantly from the center line of the apparatus. Said sensing means is connected to and actuates the said hydraulic cylinder 30 through hoses and a series of bleeder valves represented by 46 and 42, respectively.

It is understood in this description that the following pieces are common to both sides: arm 11, beam 14, support 15, pin 16, axles 23 and 23a, sleeves 24 and 24a, and chain 43.

The actual operation of this invention is as follows: Each cylinder acts independently of the other and solely in response to its corresponding sensing feeler. The activated cylinder can only cause the axles of the rolls to be arcuately rotated (the path is described by line X in FIG. 5) by the mechanical linkage as shown in FIG. 5.

However, the total resultant movement caused by the cylinders is complex and varies with the relation of each cylinder's independent response. These cylinders may work singularly, in opposition, or in unison. If singularly, the result is the twisting of only one end of the rigid axles which, due to a torsion bar effect, gives an actual slight rotation of the axles of the rolls about pivot 21, 21a, and a lateral swing of the entire moveable frame about pin 16. The rotation of the rolls' axles provides the control of sheet width, while the lateral displacement of the frame provides the sheet guidance. Thus, when only one cylinder is actuated, calling for the sheet to move away from its corresponding feeler, the piston rod will extend and through the linkage movement seen in FIG. 5, result in a rotation of the axles of the rolls to expose a lesser curvature to the sheet, and a transverse displacement of the entire moveable frame away from the feeler. For example, assuming the sheet edge to be applying too much pressure to the sensing feeler (left side of FIG. 4), the feeler will activate its corresponding cylinder to extend the piston (see FIG. 5), rotating the rolls' axles to present a lesser curvature to the sheet (the movement is shown by the solid arrows in FIG. 5), thus narrowing the sheet; and the rolls will swing transversely to the right, thus carrying the sheet away from the feeler. Conversely, assuming the sheet edge is not touching the feeler (right side of FIG. 4), the feeler will activate its corresponding cylinder to retract the piston (see FIG. 5); this causes the rolls' axles to rotate (the movement is shown by broken arrows in FIG. 5) and expose a greater curvature to the sheet, thus widening the sheet; and the rolls will swing transversely to the right, thus carrying the sheet toward the feeler.

If the necessary adjustment is great, both cylinders, may be activated. Referring to FIG. 4, when the pistons are activated in opposition, i.e., one retracting, the other extending, the resultant motion is only one of transverse displacement of the rolls, for sheet maximum guidance, there being no rotation of the axles of the rolls. Referring to FIG. 5, when the cylinders are activated in unison, i.e., both extending or retracting, the resultant motion is only a rotation of the axles of the arcuate rolls, there being no transverse motion of the rolls. In the event of both cylinders working, the guidance and width control are performed separately in alternation until an equilibrium of proper centering and width is reached.

Thus it can be seen that the apparatus provides both sheet centering and width control by the action of a single means. If a large compensation is desired two said means provide selectively sheet centering by working in opposition and sheet width control by working in unison. And if a small compensation is desired one said means is actuated to provide the sheet centering and width control.

The apparatus of the invention provides the control of sheet guidance and width with a single means. The form of the invention apparatus discussed above has two arcuate rolls, but it is not intended to be so limited, as this apparatus functions with from one to a plurality of rolls.

Various other modifications of the apparatus will be apparent to those skilled in the art and are intended to be within the scope of this invention as claimed, whereas I claim:

1. An apparatus for guidance and width control of a continuous, moving sheet comprising a frame, an arcuate roll mounted on said frame, means to impart independent arcuate rotary motion to each end of said roll, said means selectively displacing the said roll transversely of said sheet to effect sheet guidance and rotating the axis of said roll to effect sheet width control.

2. The apparatus of claim 1 wherein said frame is comprised of a triangle pivoted about one of its apexes to allow motion transverse to the sheet.

3. The apparatus of claim 1 wherein said roll is comprised of a flexural tubular sleeve mounted and turning on a rigid, one piece, arcuate axle.

4. The apparatus of claim 1 wherein said means is comprised of a bearing mounted on said frame, a support member pivotally mounted on said bearing and supporting said arcuate roll at its end, a lever arm connected to said support member and pivotally attached to an activating means.

5. An apparatus for guidance and width control of a continuous, moving sheet comprising a frame, a plurality of arcuate rolls mounted on said frame, means adapted to impart independent arcuate rotary motion to each end of said rolls with corresponding ends moving in unison, said means selectively displacing the rolls transversely for sheet guidance and rotating the axes of said rolls for sheet width control.

6. The apparatus of claim 5 wherein said frame is comprised of a triangle pivoted about one of its apexes to allow motion transverse to the sheet.

7. The apparatus of claim 5 wherein each of said rolls is comprised of a flexural tubular sleeve mounted and turning on a rigid, one piece, arcuate axle.

8. The apparatus of claim 5 wherein said means is comprise dof a plurality of bearings mounted on said frame, a support member pivotally mounted on each said bearing and supporting each said arcuate roll at its end, a lever arm connected to each said support member and pivotally attached to an activating means.

9. An apparatus for guidance and width control of a continuous, moving sheet comprising a frame, an arcuate roll mounted on said frame, first means to impart independent arcuate rotary motion to each end of said roll; corresponding sheet edge sensing means controlling said first means and said first means selectively displacing the roll transversely for sheet guidance and rotating the axis of said roll for sheet width control.

10. An apparatus for selectively guiding and controlling the width of a continuous, moving sheet comprising a triangular frame pivoted about one of its apexes, said pivotal apex formed by two arms, the opposite end of each said arm supporting a linkage, each linkage comprised of a bearing, a member pivotally mounted on said bearing and supporting an end of a roll comprised of a rigid, one piece, axle with a flexural tubular sleeve turning on said axle and over which the sheet passes, a lever arm connected to said member and pivotally attached to the piston of a hydraulic cylinder, independent sensing feelers for each edge of the sheet, each said feeler connected to and actuating a said hydraulic cylinder by a series of bleeder valves, said valves adapted to retract the respective said piston causing arcuate rotary movement of the axis of said roll in one direction when the sheet is not contacting said feeler, and to extend the respective said piston when the sheet is applying too much pressure to said feeler causing arcuate rotary movement of the axis of said roll in the opposite direction, said linkages selectively displacing the roll transversely of the moving sheet when said cylinders are working in opposition to effect sheet guidance and arcuately rotating the axis of said roll when said cylinders are working in unison to effect sheet width control.

11. An apparatus for selective guidance and width control of a continuous, moving sheet comprising a frame, an arcuate roll mounted on said frame, means for independent arcuate rotary motion of each end of said roll, said means selectively working in opposition to displace the said roll transversely with respect to the sheet to effect sheet guidance, and working in unison to rotate the axis of said roll to effect sheet width control.

12. An apparatus for selective guidance and width control of a continuous, moving sheet comprising a frame, an arcuate roll mounted on said frame, first means for independent arcuate rotary movement of each end of said roll, corresponding sheet edge sensing means controlling said first means, said first means selectively working in opposition to displace the said roll to effect sheet guidance and working in unison to rotate the axis of said roll to effect sheet width control.

References Cited

UNITED STATES PATENTS 2,722,415 11/1955 Wood _____ 226—23 X
2,823,443 2/1958 Umstott _____ 26—63

M. HENSON WOOD, Jr., *Primary Examiner.*

R. A. SCHACHER, *Assistant Examiner.*